United States Patent [19]

Wölfges et al.

[11] Patent Number: 4,938,118

[45] Date of Patent: Jul. 3, 1990

[54] CONTROL VALVE

[75] Inventors: Hans Wölfges, Lohr; Wolfgang Volpert, Gemünden, both of Fed. Rep. of Germany

[73] Assignee: Mannesmann Rexroth GmbH, Lohr, Fed. Rep. of Germany

[21] Appl. No.: 307,832

[22] Filed: Feb. 8, 1989

[30] Foreign Application Priority Data

Feb. 19, 1988 [DE] Fed. Rep. of Germany ....... 3805288

[51] Int. Cl.$^5$ ............................................ F15B 13/16
[52] U.S. Cl. ........................................ 91/361; 91/365; 91/417 R; 91/433; 91/461
[58] Field of Search ............. 91/361, 365, 433, 417 R, 91/461

[56] References Cited

U.S. PATENT DOCUMENTS

| | | | |
|---|---|---|---|
| 3,706,322 | 12/1972 | Carlson | 91/433 |
| 4,089,171 | 5/1978 | Hubbard | 91/461 |
| 4,543,875 | 10/1985 | Imhof | 91/461 |

Primary Examiner—Edward K. Look
Assistant Examiner—John E. Ryznic
Attorney, Agent, or Firm—Harness, Dickey & Pierce

[57] ABSTRACT

A 3/2 proportional control valve is provided with an actuating piston which is subjected to the control pressure set in a pilot valve. The area relationships of the actuating piston are so chosen that at the actuating piston a high pressure gradient obtains and the adjustment dynamics of the regulating piston are increased.

10 Claims, 1 Drawing Sheet

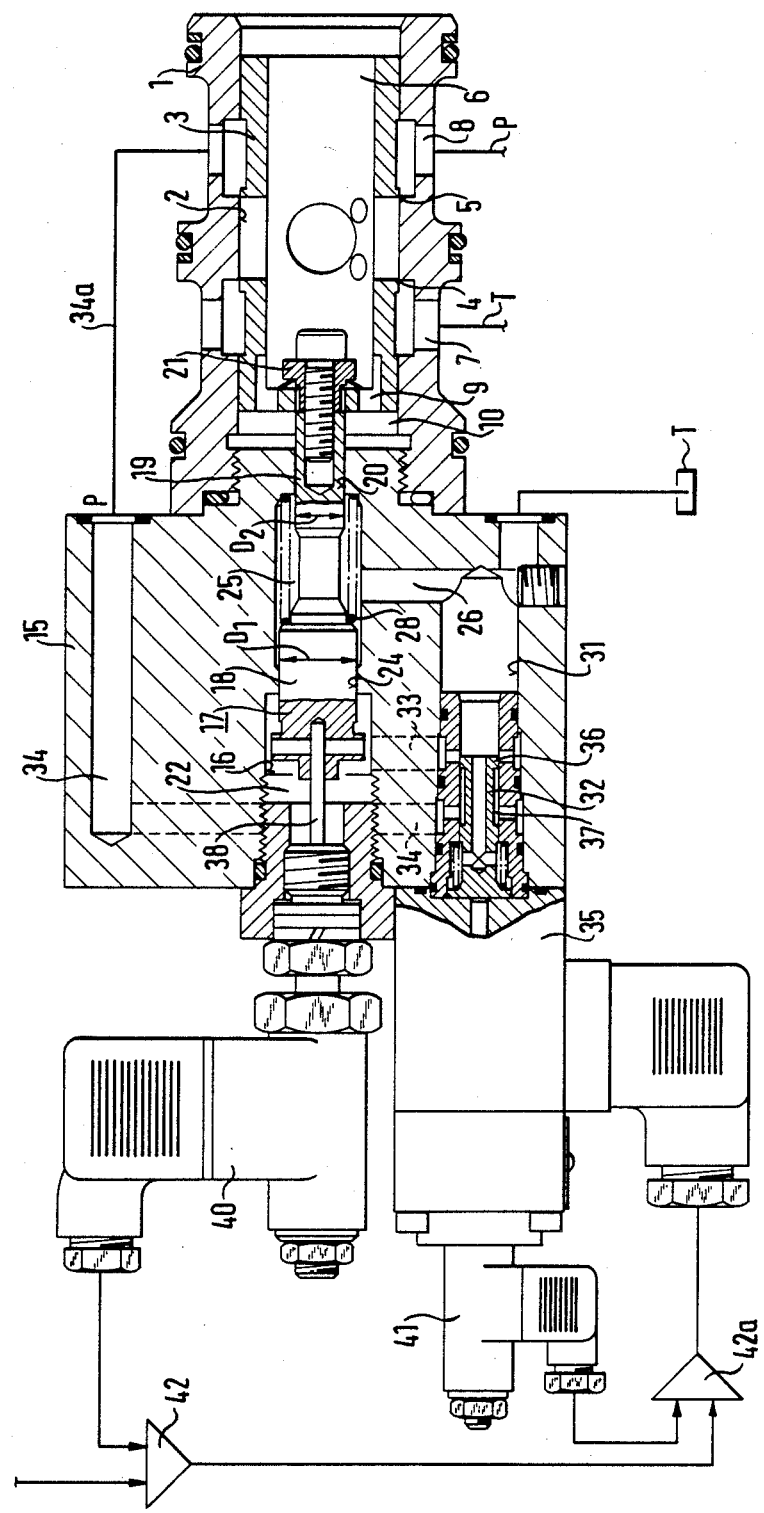

CONTROL VALVE

The invention relates to a control valve according to the preamble of claim 1.

For pressure control in a system 3/2 control valves are known. The control pressure set by an electrically driven pilot valve acts on the one side of the regulating piston in the direction of a connection between a fluid source and the regulating pressure space whilst a spring together with the regulating pressure acts on the other side of the regulating piston in the direction of a connection between a tank and the regulating pressure space. Such valves are known for example as Bosch control valves for block installation.

The problem underlying the invention resides in increasing the control speed of such control valves.

Said problem is solved according to the invention by the features set forth in the characterizing clause of claim 1.

Accordingly, an actuating piston is provided with which it is possible to increase the pressure gradient for adjusting the regulating piston and thus to increase the adjusting dynamics of the regulating piston. Even when the regulating piston is substantially equal to the pressure of the fluid source at the valve piston of the pilot valve a high pressure gradient still obtains so that the regulating piston can open the connection between the fluid source and the regulating pressure space. Furthermore, the control displacement for actuating the actuating piston is relatively small.

Advantageous further developments of the invention will be apparent from the subsidiary claims.

An example of embodiment of the invention will be explained in detail hereinafter with reference to the drawing of which the single FIGURE shows a section through a control valve with pilot valve.

The control valve is provided as installation valve in a valve block which is not shown and consists of a valve housing 1 having a bore 2 in which a regulating piston 3 is displaceably arranged which has control edges 4 and 5 via which the regulating pressure space 6 is connectable to a connection 7 leading to a tank or to a connection 8 leading to a fluid source. Furthermore, the regulating piston 3 comprises bores 9 so that the regulating pressure is also effective in the space 10. The valve housing 1 is mounted on a valve cover 15 which comprises a bore 16 which aligns with the regulating piston axis and in which an actuating piston 17 is displaceably arranged which consists of an actuating piston portion 18 of larger diameter and an actuating piston portion 19 of smaller diameter. The portion 19 with the smaller diameter $D_2$ faces the regulating piston 3, is sealingly led through a bore 20 and is connected to the regulating piston at 21. The portion 18 with the larger diameter $D_1$ is led sealingly through a bore 24 and extends into a control pressure space 22. Between the two portions 18 and 19 there is a pressure-relieved space 25 which is connected via a passage 26 to the tank. In the space 25 a spring 28 is arranged which bears on the portion 18 on the one hand and on the valve cover 15 on the other.

Provided axis-parallel to the bore 16 in the valve cover 15 is a further bore 31 in which a valve piston 32 of a pilot valve is disposed which is a 3/2 way directional control valve, a connection 33 leading to the control pressure space 22 being connectable to a connection 34 connected to the fluid source or to the bore 31 carrying the tank pressure. The pilot valve is controlled by a proportional magnet 35 with attached displacement pickup 41. The core of the displacement pickup and the armature of the proportional magnet are fixedly connected together.

Furthermore, on the actuating piston portion 18 a pin 38 is mounted which passes through the control pressure space 22 and projects into the interior of a displacement pickup 40. Fixedly attached to the pin 38 is the core of the displacement pickup. The construction of the two displacement pickups is generally known.

The electrical signal generated by the displacement pickup 40 corresponds to the actual value of the position of the regulating piston 3. The signal is linked in a closed-loop control circuit 42 to a desired value and therefrom a controlled variable is formed which is used to drive the subordinate control circuit 42a with the proportional valve 35 and displacement pickup 41 and thus to set a control pressure in the chamber 22.

The mode of operation of the control valve is as follows: If at the desired value input of the control circuit 42 the desired value zero % is entered the regulating piston 3 is to assume the position illustrated, i.e. its centre position in which the space 6 is shut off from the connections 7 and 8 leading to the tank and the pressure source at the control edges 4 and 5. The actual value position of the regulating piston 3 is detected by the displacement pickup 40 and sent to the closed-loop control circuit 42. As long as there is a desired-actual difference at the controller input a manipulated variable for the subordinate control circuit 42a with the proportional magnet 35 and displacement pickup 41 is formed and drives the pilot piston 32 in such a manner that via the control piston in the space 22 the regulating piston 3 is moved until the desired-actual difference in the control circuit 42 is zero and thus the corresponding position of the regulating piston 3 is reached.

The setting of the control pressure in the space 22 is effected in known manner by the pilot valve 32, the connection 33 being connectable with the aid of the piston collar 36 via the annular space 37 to the pressure connection 34, 34a or to the bore 31 carrying the tank pressure.

The regulating piston 3 is pressure-compensated so that the regulating pressure in the space 6 acts only on the area of the actuating piston portion 19 defined by the diameter $D_2$. The spring 28 acts in the same sense as the regulating pressure. The control pressure in the space 22 acts against these forces. If at the controller 42 there is no difference between the desired value and actual value the forces at the actuating piston 17 are in equilibrium.

If the desired value is increased from zero to 100% the control edge 5 opens the pressure connection 8 to the space 6 whereas if the desired value is adjusting from zero to minus 100% the control edge 4 opens the space 6 to the tank connection 7.

For example, if on a desired value jump the control edge 5 is to connect the pressure connection 8 to the regulating pressure space 6 an increased control pressure is adjusted in the space 22 via the pilot valve 32. Since the area of the actuating piston portion 18 subjected to the control pressure is considerably greater than the area of the portion 9 subjected to the regulating pressure, a high pressure gradient arises in the actuating piston. Via the connection 33 control fluid with high pressure gradient and thus in large amount can flow into the space 22 so that the actuating piston 17 and thus the regulating piston 3 rapidly move to the open position. A high pressure gradient is also present when the regulating pressure in the space 6 is equal to or approximately equal to the pressure of the fluid source in the connection 8. Thus, in this state as well the regulating piston 3 can open the connection of the space 6 to the connection 8. For increasing the response speed of the control valve it is also favourable for the control displacement of the space 22 to be considerably smaller than the space 10 when the control pressure acts directly on the regulating piston 3.

If however via the control edge 4 the connection of the space 6 to the tank connection 7 is to be opened the passage 33 is opened to the tank by the pilot valve. The pressure spring 28, assisted by the regulating pressure force acting on the piston portion 19, shifts the actuating piston to the left.

We claim:

1. Control valve comprising a regulating piston which by a control pressure is adjustable oppositely to a regulating pressure acting in a regulating pressure chamber on the regulating piston, control edges for selectively connecting the regulating pressure chamber to a fluid source or a tank, and a pilot valve driven by a signal depending on a desired value and a control position of the regulating piston, characterized in that the regulating piston is connected to an actuating piston having two portions of different cross-sectional area, the portion with a larger cross-sectional area subjected to the control pressure and the portion with a smaller cross-sectional area subjected in an opposite sense to the regulating pressure, and both of the cross-sectional areas of the actuating piston being smaller than the cross-sectional area of the regulating piston.

2. Control valve according to claim 1, characterized in that the ratio of the cross-sectional areas of the actuating piston is about 2:1.

3. Control valve according to claim 1, characterized in that between the regulating piston and the end of the actuating piston subjected to the control pressure a space is provided which is connected to the tank and in which a spring acting oppositely to the control pressure is arranged.

4. Control valve according to claim 1, characterized in that on increasing the control pressure a connection is opened between the regulating pressure chamber and a pressure connection and on reducing the control pressure a connection is opened between the regulating pressure chamber and a tank connection.

5. Control valve according to claim 1, characterized in that a displacement pickup is mounted on the actuating piston.

6. Control valve according to claim 1, characterized in that the actuating piston and the pilot valve are arranged axis-parallel in a housing cover.

7. Control valve according to claim 1, characterized in that the pilot valve is a 3/2 proportional way valve which is arranged adjacent a space conducting the control pressure, the pilot valve having a bore which opens into a connection which leads to the tank and which opens into a pressure-relieved space between the two portions of the actuating piston having the larger and smaller cross-sectional areas respectively.

8. Control valve according to claim 3, characterized in that the actuating piston portion with the smaller cross-sectional area is arranged sealingly in a first housing bore between the space connected to the tank and the regulating piston and the actuating piston portion with the larger cross-sectional area is arranged sealingly in a second housing bore between the space connected to the tank and the end of the adjusting piston subjected to the control pressure.

9. Control valve according to claim 6, characterized in that on the housing cover a valve housing is arranged for the regulating piston for installation into a valve block.

10. Control valve according to claim 8, characterized in that a space is provided adjoining the end of the regulating piston facing the actuating piston which is subjected to the regulating pressure.

* * * * *